(12) United States Patent
Wimbert et al.

(10) Patent No.: US 7,217,019 B2
(45) Date of Patent: May 15, 2007

(54) VEHICLE LIGHT HAVING A CRUCIFORM LIGHT DISTRIBUTION

(75) Inventors: Frank Wimbert, Eisenach (DE); Hermann Werner, Eisenach (DE); Reingard Wolff, Farnroda (DE)

(73) Assignee: Fer Fahrzeugelektrik GmbH, Eisenach (DE)

( * ) Notice: Subject to any disclaimer, the term of this patent is extended or adjusted under 35 U.S.C. 154(b) by 0 days.

(21) Appl. No.: 10/506,077

(22) PCT Filed: Sep. 11, 2003

(86) PCT No.: PCT/EP03/10127

§ 371 (c)(1),
(2), (4) Date: Aug. 31, 2004

(87) PCT Pub. No.: WO2004/026627

PCT Pub. Date: Apr. 1, 2004

(65) Prior Publication Data

US 2005/0117360 A1    Jun. 2, 2005

(30) Foreign Application Priority Data

Sep. 11, 2002    (DE) ................................ 202 14 039

(51) Int. Cl.
*B60Q 1/26* (2006.01)

(52) U.S. Cl. ...................... 362/540; 362/330; 362/511; 362/545

(58) Field of Classification Search ................ 306/545, 306/540, 506, 511, 351, 330, 354, 342; 40/547, 40/580, 550, 579; 362/456
See application file for complete search history.

(56) References Cited

U.S. PATENT DOCUMENTS

| 1,284,016 | A | * | 11/1918 | Wise | 40/579 |
| 1,371,470 | A | * | 3/1921 | Chubb | 40/579 |
| 3,703,636 | A | * | 11/1972 | Schmitt | 362/298 |
| 4,240,220 | A | * | 12/1980 | Smith | 40/564 |
| 5,226,723 | A | | 7/1993 | Chen | |
| 5,444,932 | A | * | 8/1995 | Jeroma | 40/564 |
| 5,564,816 | A | * | 10/1996 | Arcadia et al. | 362/183 |
| 6,837,602 | B1 | * | 1/2005 | Lee | 362/520 |

FOREIGN PATENT DOCUMENTS

| DE | 197 28 354 A1 | 1/1999 |
| DE | 197 28 354 | 2/1999 |
| DE | 198 30 298 A1 | 2/2000 |
| DE | 199 51 407 A1 | 5/2001 |
| DE | 100 36 323 | 2/2002 |
| DE | 100 36 323 A1 | 2/2002 |
| DE | 202 11 305 U1 | 11/2002 |
| EP | 404 990 A1 | 1/1991 |

* cited by examiner

*Primary Examiner*—Renee Luebke
*Assistant Examiner*—Gunyoung T. Lee
(74) *Attorney, Agent, or Firm*—Sughrue Mion, PLLC

(57) ABSTRACT

In a vehicle lamp, in particular a side marking lamp for a motor vehicle, comprising at least one light source and at least one optical system (6a, 6b) arranged in the beam path of the light source, the substantially conical light beam issuing from the light source impinges directly on the optical system (6a, 6b) and shines therethrough, wherein the optical system (6a, 6b) is such that it produces therefrom a cruciform light distribution (3).

15 Claims, 6 Drawing Sheets

VEHICLE LIGHT HAVING A CRUCIFORM LIGHT DISTRIBUTION

BACKGROUND OF THE INVENTION

The invention concerns a vehicle lamp, in particular a side marking lamp, as set forth in the classifying portion of claim 1.

The photometric requirements in respect of side marking lamps of motor vehicles are laid down in national and international regulations and requirements. They specify inter alia the angular regions from which and the light intensity with which the light signal must be visible to other road users.

In the case of side marking lamps as are used for example on commercial vehicles such as buses and heavy goods vehicles, the minimum requirements in terms of the visibility range are prescribed for example at 10° upwardly and downwardly respectively and 45° towards the left and the right respectively from a reference axis HV (center line extending in the direction of radiation) of the lamp. In that respect a uniform minimum light intensity is required in the entire visibility range. It is only at the center of light distribution that the light intensity must be markedly higher.

FIG. 1 shows the minimum photometric requirements for a side marking lamp. The window illustrated represents the minimum visibility range of the side marking lamp, with a radiation angle, in relation to a center point 5, of 10° upwardly and downwardly, as indicated at 10° U and 10° D, and 45° towards the left and the right, as indicated at 45° L, 45° R. In that respect, a substantially higher level of light intensity of for example 4 cd is prescribed at the center point 5 (central peak) than in the region 4 (for example 0.6 cd).

When using LEDs as the light source, satisfying that requirement gives rise to problems as an LED has an irregular, approximately bell-shaped radiation characteristic, with a light intensity which is very high at the center 5 and which falls off outwardly in a bell configuration. In the transitional region between the center 5 and the outer region 4 however the light intensity is generally substantially higher than it would have to be in accordance with the minimum requirements. Therefore, to save on light power, light-refracting optical systems are used, which produce a substantially uniformly bright light bar. Such a lamp however can be positioned only in one installation position, for example horizontally.

Known lamps which can be mounted in different positions (for example also turned through 90°) include an optical system which for example produces a circular projection, as is illustrated in FIG. 2 by reference numeral 1. By virtue of that arrangement, it is admittedly possible for the lamp to be fitted in different positions (in turned relationship), but a high level of light power is required in order to appropriately illuminate the respective projection surface.

That is relatively expensive in the case of an LED as additional light power when using LEDs causes a considerable increase in costs, in comparison with incandescent lamps.

SUMMARY OF THE INVENTION

Therefore the object of the present invention is to provide a vehicle lamp which can be mounted in positions which are turned relative to each other through 90° in each case and which is as inexpensive as possible and which nonetheless satisfies the minimum photometric requirements.

The essential concept of the invention is that of providing a vehicle lamp, in particular a side marking lamp, with an optical system which produces a cruciform light distribution. By virtue thereof, in comparison with a circular radiation pattern, a substantially smaller projection area (namely only a cruciform projection area) is irradiated, and substantially less light power is required for that purpose. It is thus possible to use weaker and therefore more favourable light sources, the light emitted from which is used substantially more efficiently than in the state of the art.

In addition it is possible for the lamp to be mounted in a plurality of positions, preferably in four positions, turned in each case through 90°. In the case of a side marking lamp it can be fitted for example both horizontally and also vertically (turned through 90°) to a vertical side wall of a vehicle.

In accordance with a preferred embodiment of the invention the lamp includes 2n LEDs, wherein n is an integer $\geq 1$. With this kind of light sources, considerable cost advantages are afforded by saving on light power.

A possible way of implementing the cruciform light distribution involves the use of an optical system of cruciform configuration.

The optical system according to the invention preferably has a central converging lens. As a result the level of light intensity at the center of the light distribution can be additionally increased.

The optical system is preferably arranged in or on a light exit surface, for example a surface formed from transparent plastic material.

A particularly preferred vehicle lamp includes two cruciform optical systems, each of which deflects the light incident thereon from the light source into the one bar of the cross of the cruciform light distribution produced thereby more strongly than into the other bar of the cross configuration. In accordance with the invention those two optical systems are positioned in mutually juxtaposed relationship in such a way that the two 'light beams' delivered thereby and each being of a cruciform cross-section, after passing through a very small near region, combine in such a way that, at medium and great distance, they produce a single cruciform light spot on a projection surface which is perpendicular to HV. By virtue of the fact that in accordance with the invention the two optical systems are arranged turned through 90° relative to each other, the above-described asymmetry of the light distribution on to the two crossbars of the individual 'light beams' is completely compensated in the combined overall light beam and the vehicle lamp can be turned in 90° steps without anything being changed in terms of the distribution of intensity of the overall light beam produced, in the medium or far region.

These and further advantageous configurations and developments of a vehicle lamp according to the invention are set forth in the appendant claims.

BRIEF DESCRIPTION OF THE DRAWING

The invention is described hereinafter by means of embodiments by way of example with reference to the drawing in which.

Figure 1:
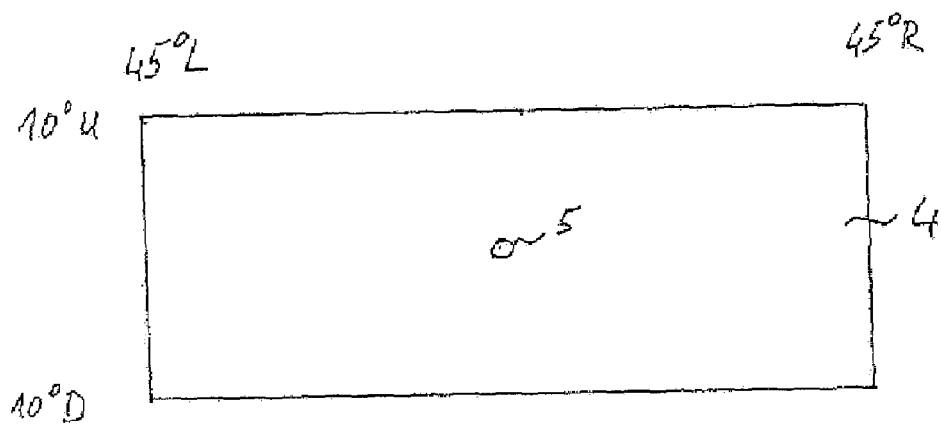
FIG. 1 is a view of a light distribution for a side marking lamp in accordance with minimum photometric requirements.

In regard to the description of FIG. 1, attention is directed to the introductory part of this description.

DETAILED DESCRIPTION OF THE INVENTION

Figure 2:
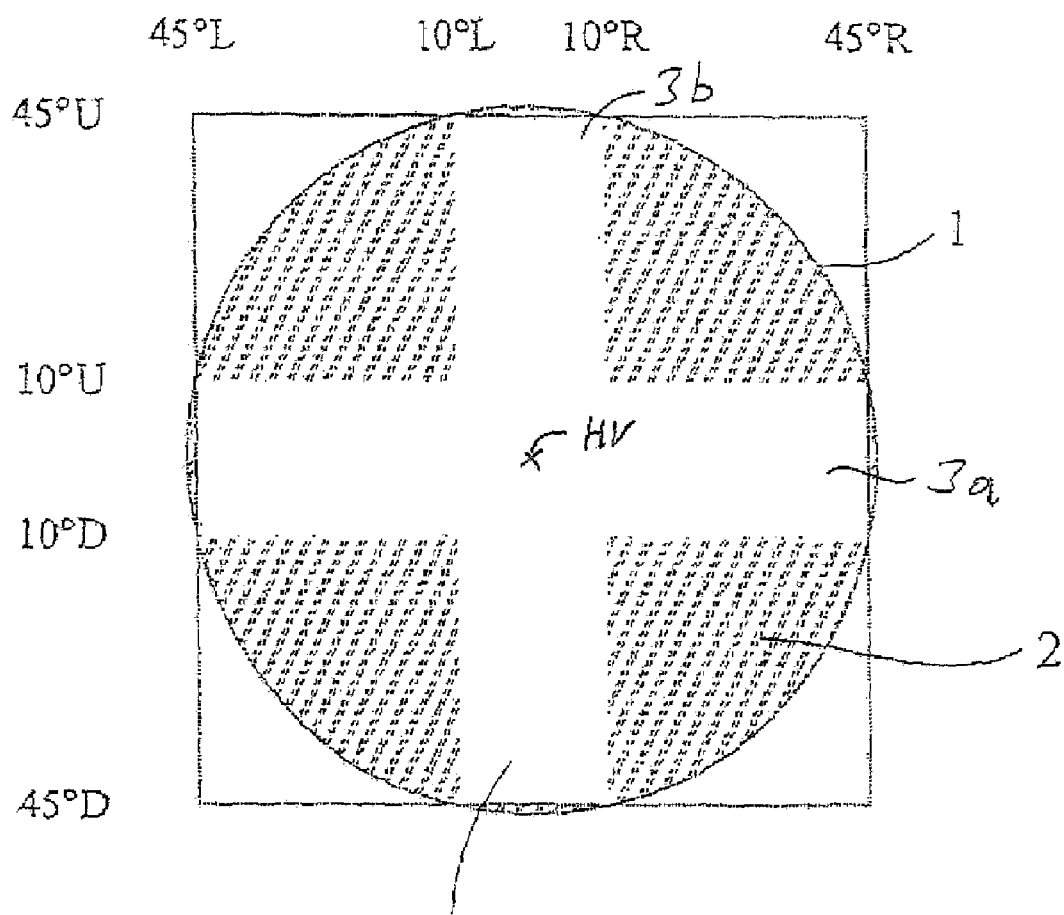
FIG. 2 is a view of a light distribution when using an optical system according to the invention.

FIG. 2 shows the circular projection 1 of a light cone as is emitted by conventional vehicle lamps which can be mounted to a vehicle wall both vertically and also horizontally (that is to say turned through 90°). Because of the relatively large irradiated area the light power required in respect of the light source used is also relatively high.

A lamp in accordance with the invention therefore includes an optical system which produces a cruciform light distribution 3 with two mutually perpendicular light bars 3a and 3b. As the light distribution is totally symmetrical in the bars 3a and 3b, a lamp according to the invention can also be installed in a position of being turned through 90° without the light distribution of the light cone which is projected into space being markedly altered. As the area of the light bars 3a, 3b, at any distance from the light source, is substantially smaller than that of the associated circular cone cross-section 1, a substantially lower level of light power is sufficient to achieve the same, prescribed brightness.

As specified in the photometric regulations for side marking lamps, the light bar 3a, with respect to the central light cone axis HV, involves an extent of 10° upwardly and downwardly respectively and 45° towards the left and the right respectively.

In comparison, the vertical light bar 3b is of a vertical extent of 10° towards the left and the right and a vertical extent of 45° upwardly and downwardly respectively so that, when the lamp according to the invention is turned through 90°, the light bar 3b can readily perform the function of the horizontal light bar.

Figure 3:
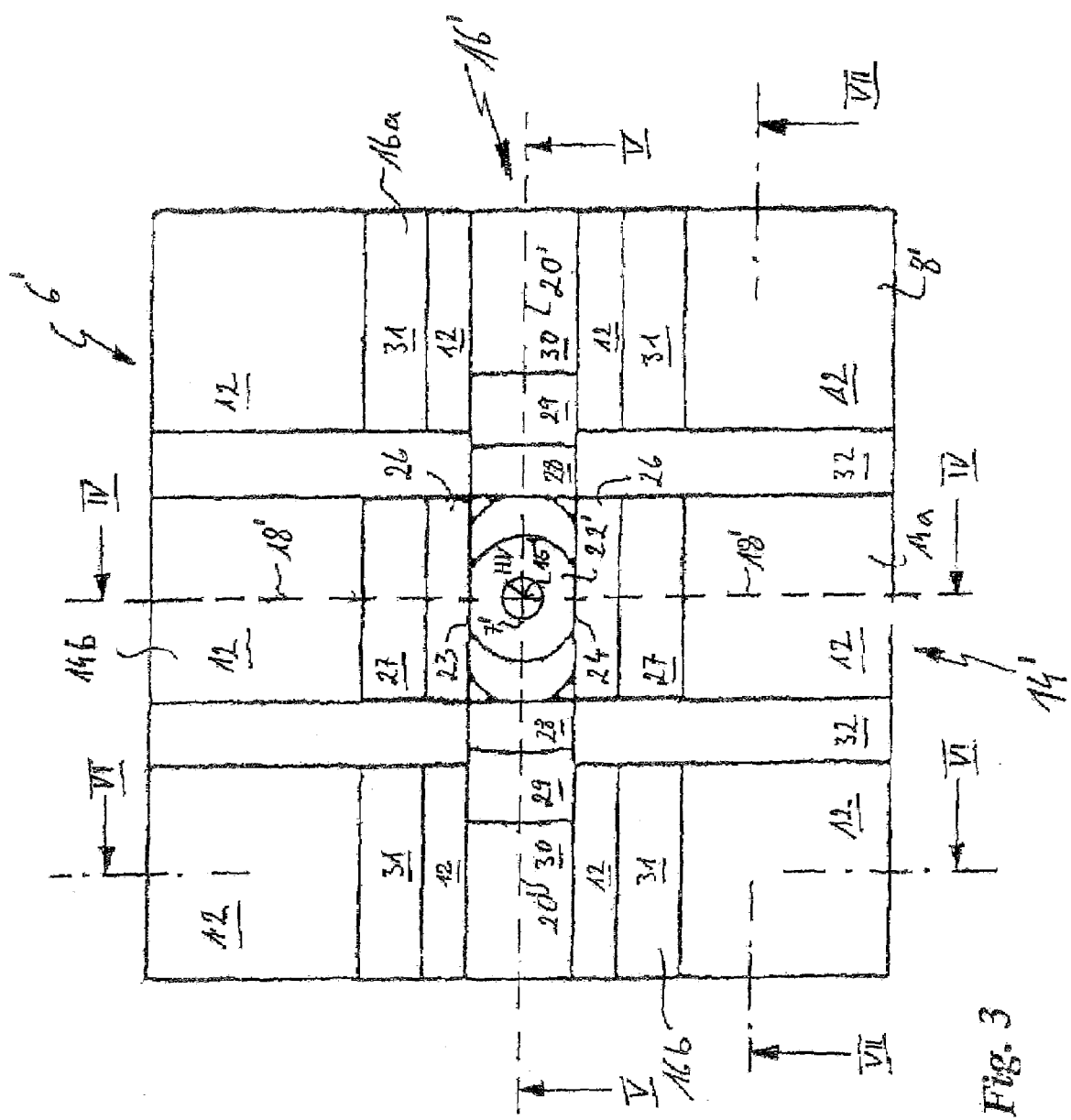
FIG. 3 is a plan view of the rear side, which is towards the light source, of an optical system according to the invention for producing an asymmetrical, cruciform light distribution.

FIG. 3 shows an optical system 6a for a lamp according to the invention which, in combination with an identical optical system 6b (see FIG. 8) which is arranged beside it and turned through 90°, is in a position to produce the horizontally and vertically completely symmetrical light distribution which is shown in FIG. 2.

Figure 8:
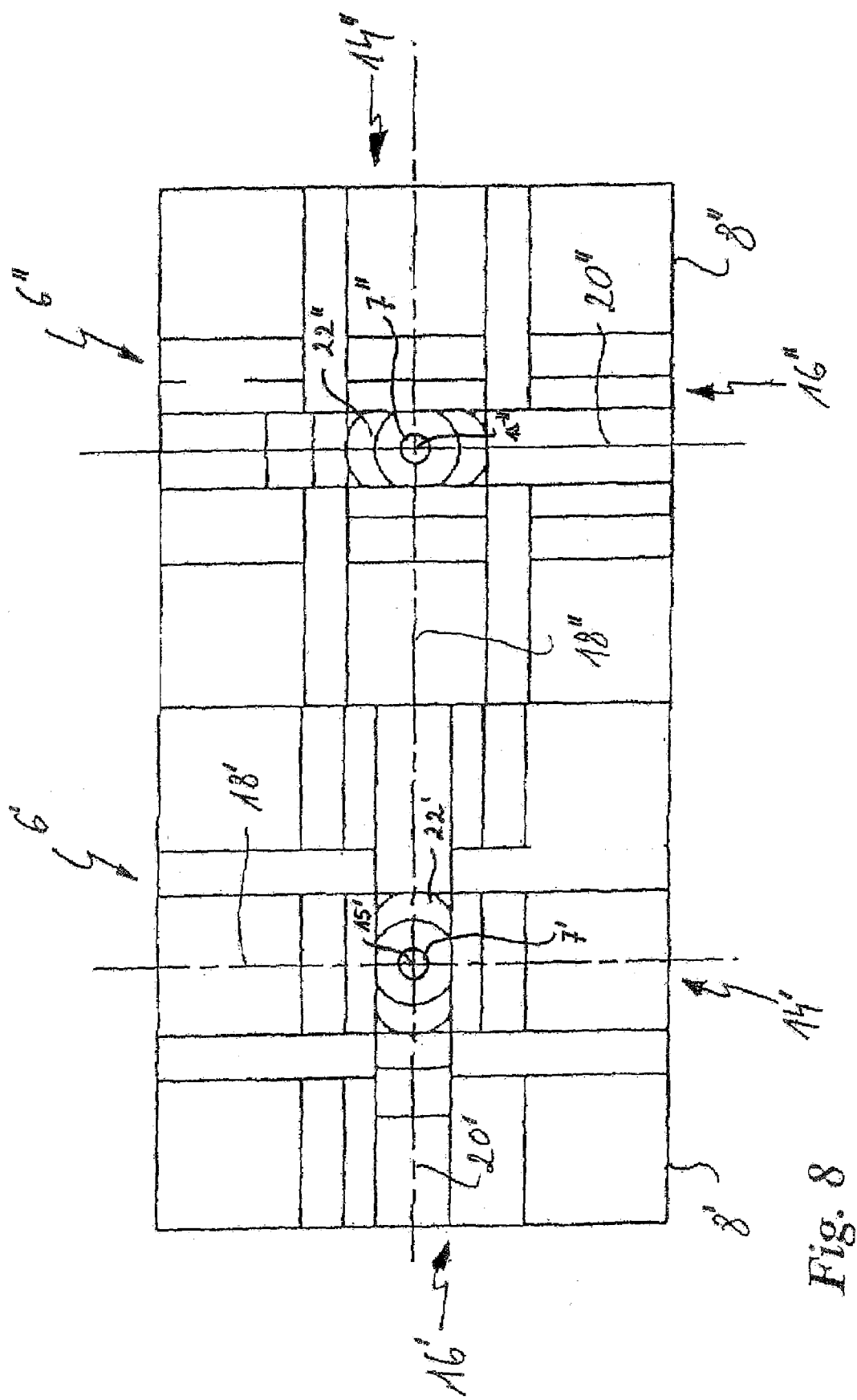
FIG. 8 is a plan view similar to FIG. 3 on to the rear side, which is towards two light sources, of two mutually juxtaposed optical systems which jointly produce a symmetrical, cruciform light distribution.

Each of the optical systems 6' and 6" is formed in a plate-shaped body 8', 8" of a transparent material and is of a substantially square shape in the plan view shown in FIGS. 3 and 8 respectively.

In the direction of view in those two Figures, provided in front of the plate-shaped body 8', 8" for each of the two optical systems 6', 6" is a light source 7', 7", preferably a light emitting diode, which radiates a conical light beam 13 on to the rear side 10 of the body 8", 8", which is opposite to the viewer, in such a way that the central axis of symmetry HV of that light beam 13 impinges on that rear side 10 in substantially perpendicular relationship and passes through the body 8', 8" at the centre of the square formed by the respective optical system 6' and 6", respectively without a change in direction.

As can be seen in particular from the sectional views in FIGS. 4 through 7 which show optical system 6' and its body 8" only, the body 8' is substantially in the form of a flat plate with plane-parallel front and rear sides 9 and 10 respectively, in which respect however incorporated into the rear sides 10 is a row of optically active structures which are described in greater detail hereinafter.

In the present context, the term optically active structure is used to denote any lens-like or prism-like structure which is capable of changing the direction of light beams passing therethrough, through a predetermined angle.

Besides those optically active structures, each of the optical systems 6', 6" has a plurality of optically inactive regions 12, through which the incident light passes without a change in direction.

Figure 6:
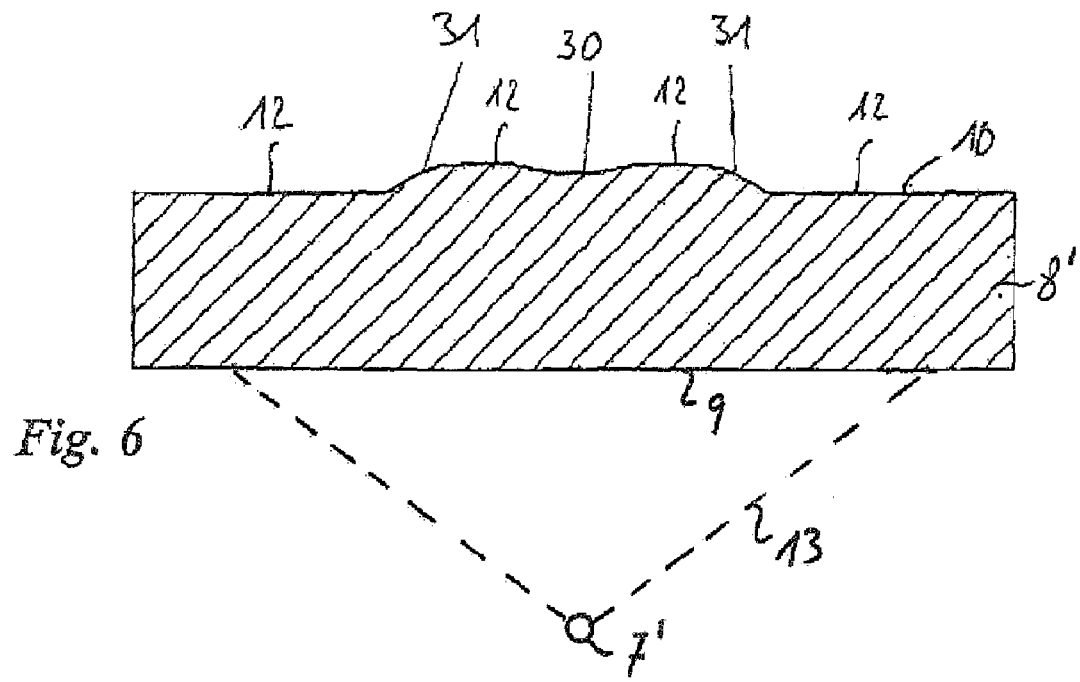
FIG. 6 shows a view in section through the optical system of FIG. 3 taken along line VI—VI.
Figure 7:
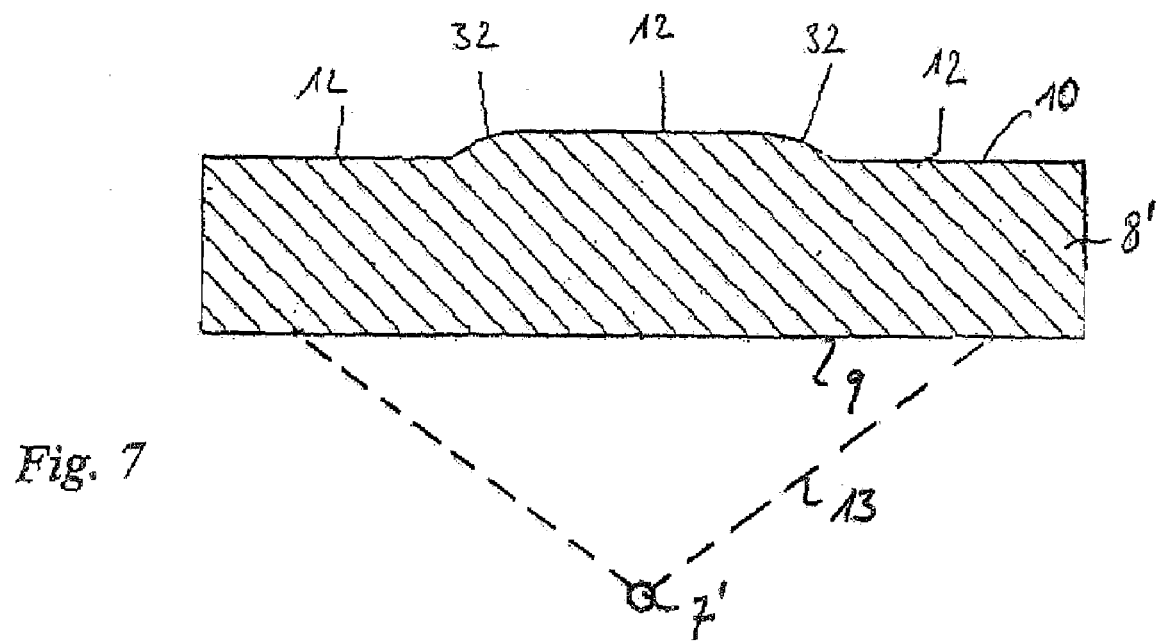
FIG. 7 shows a view in section through the optical system of FIG. 3 taken along line VII—VII.

As can be seen in particular from FIGS. 6 and 7, in this case the various regions 12 do not necessarily have to be of the same thickness. The only aspect which is common to them is optical inactivity in the above-defined sense.

As FIGS. 3 and 8 show the optically active structures of each optical system 6' and 6" respectively are arranged along two crossbars 14', 14", 16', 16", the central axes 18', 20', 18", 20" of which cross at the center of the respective square, that is to say at the point of intersection 15' being concentric with the central axis HV of the incident light cone 13.

Admittedly the two arms 14a, 14b and 16a, 16b respectively of each crossbar 14', 14" and 16', 16" are of a symmetrical configuration with respect to the center just referred to above, but the two crossbars 14', 14", 16', 16" differ from each other in terms of the optically active individual structures forming them.

Provided in concentric relationship with the points of intersection 15', 15" of the two central axes 18', 18", 20', 20" a converging lens 22', 22" which focuses the light impinging thereon in such a way that it produces the required brightness peak in the HV direction.

As the light which is incident from the light source 7', 7" has a level of brightness which decreases in an approximately bell-shaped configuration from the inside outwardly, the optically active individual elements adjoining the central converging lens 22', 22" in the crossbars 14', 14", 16', 16" provide for re-distribution of the incident light from regions with a light excess at the center of the arrangement and the area immediately surrounding same into the further outwardly disposed angular regions which involve a light deficiency.

It will be noted that this takes place in different ways in the two crossbars 14', 14", 16', 16".

Figure 4:
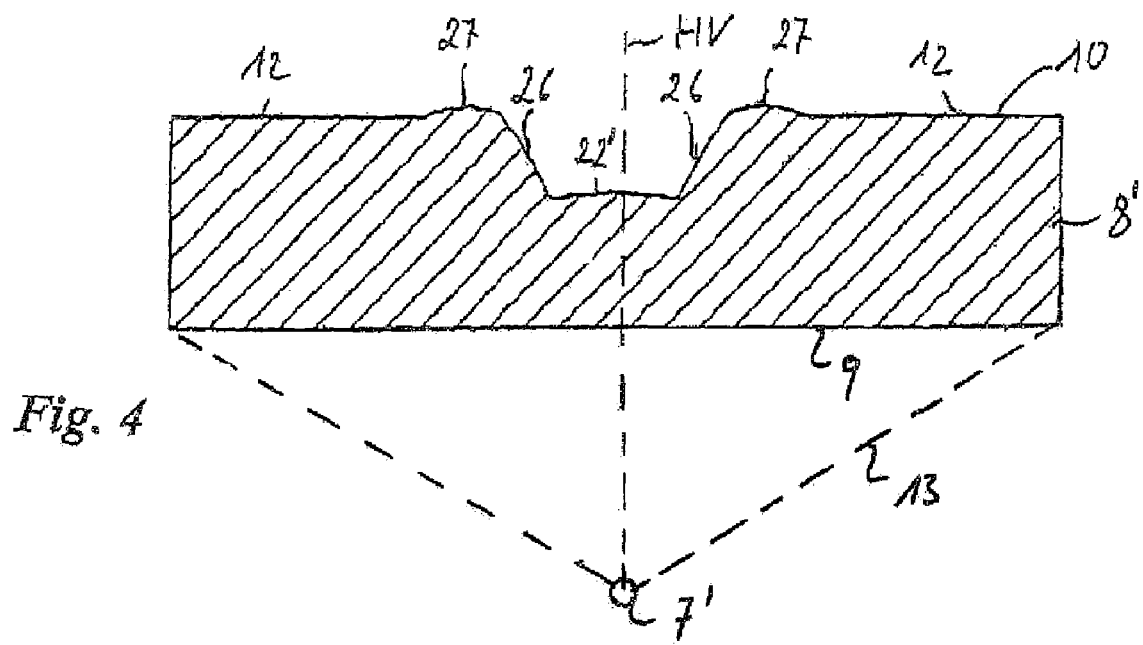
FIG. 4 shows a view in section through the optical system of FIG. 3 taken along line IV—IV.

As can be seen from the sectional view in FIG. 4 the central lens 22' is of only a relatively small extent in the direction of the crossbar 14' so that in the plan view in FIG. 3 it appears as a circle which is cut off on two sides, wherein the two secants 23, 24 extend in parallel relationship with the central axis 20' of the horizontal crossbar 16'. In the direction of the vertical crossbar 14', adjoining the central converging lens 22' on each side and symmetrically relative to the point of intersection 15' of the central axis HV is an optically active structure 26 which is shown in the sectional view in FIG. 4 as a steeply rising prismatic edge surface which distributes the light incident thereon outwardly while the dome-shaped or lens-shaped, optically active regions 27 which immediately adjoin same expand the light impinging thereon and distribute it over the entire region of the respective crossbar arm 14a and 14b respectively.

A respective optically inactive region 12 then outwardly adjoins the optically active regions 27.

Figure 5:
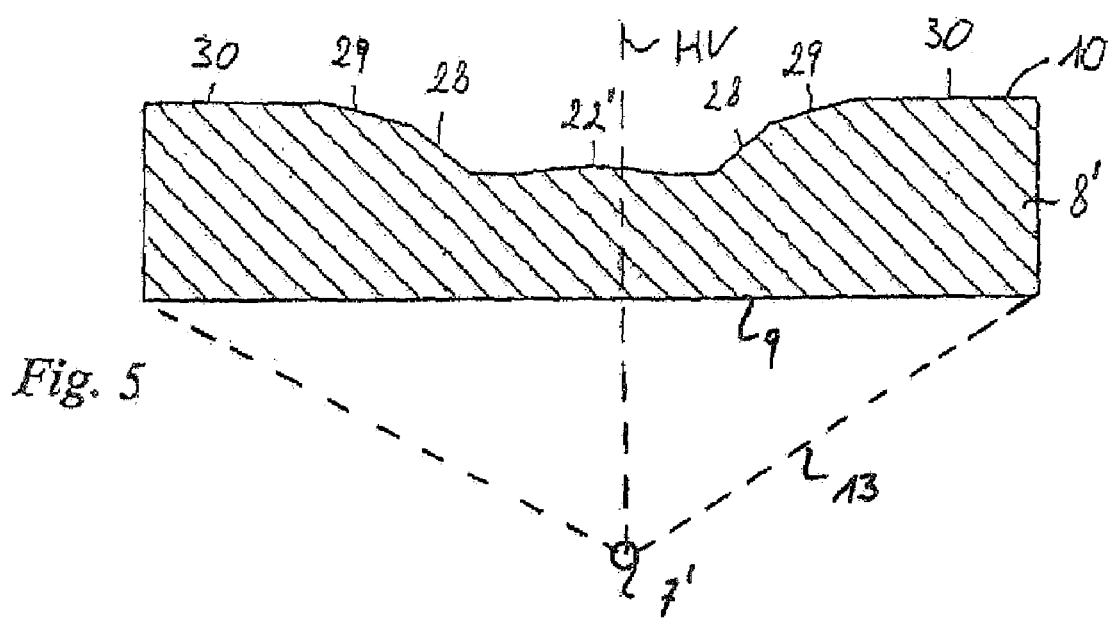
FIG. 5 shows a view in section through the optical system of FIG. 3 taken along line V—V.

As the sectional view in FIG. 5 shows the central lens 22' is of a substantially greater extent in the direction of the central axis 22' of the crossbar 16' so that here the full circular shape is attained. Then, adjoining the lens 22' on both sides, in symmetrical relationship with the point of intersection 15 on the central axis HV, are two optically active elements 28, 29 which are both shown in the sectional view in FIG. 5 in the form of rising prismatic edge surfaces, wherein the edge surface of the optically active element 28 is steeper than that of the optically active element 29. The two distribute only outwardly the light incident thereon, similarly to the optically active elements 26. Adjoining the optically active elements 29 on both sides is an optically active element 30, the significance of which is explained hereinafter.

In addition the horizontal crossbar 16' includes optically active elements 31 which, as can be seen from FIG. 6, are in the form of segments of a cylinder, wherein the longitudinal axes of those cylinders extend in parallel relationship with the central axis 20' of the horizontal crossbar 16'. By means of those optically active elements 31 light from regions outside the required zones is refracted in such a way that it is incident in the regions in which an increase in the intensity of light is required.

The vertical crossbar 14' also includes optically active regions 32 (see FIG. 7) which are in the form of segments of a cylinder and which perform the same function as the optically active elements 31.

By virtue of the fact that the light source 7' must be at a certain minimum spacing from its associated optical system 6' (that is to say in front of the plane of the drawing in FIG. 3) and 6" respectively, because otherwise, with inaccurate positioning, the resulting angular errors become excessively great, the crossbars 14', 16' and 14", 16" are not of an identical configuration, as already indicated above. Geometrically, the optically active elements 26 and 27 which are disposed between the optically active elements 32 of the vertical crossbar 14', extending in the longitudinal direction of the bar, like the optically inactive regions 12 thereof, are of the correct width to allow the light to pass therethrough in the required angular region and distribute it in the vertical crossbar 14' respectively.

For geometrical reasons the remaining space, for the horizontal crossbar 16', is not sufficient for it to be of the same width so that its optically active regions 28, 29, 30 must be narrower, in perpendicular relationship with the central axis 20'. In order to be able to at least partially compensate for this, as shown in FIG. 6, provided in the optically inactive region 12 which is between the optically active regions 31, 32 is the concave, optically active region 30 which has already been mentioned hereinbefore with reference to FIG. 5 and which, as shown in FIG. 7, is not present in the vertical crossbar 14'.

The lens effect produced by that concave region 30 provides that the edge region of the cruciform light distribution is better supplied with light.

As the asymmetrical light distribution, behind each one of the optical systems 6' and 6", cannot be completely compensated by the optically active regions 30, in accordance with the invention, for a vehicle lamp which can be mounted turned through 90° steps, as shown in FIG. 8, two optical systems 6', 6" are arranged in directly mutually adjacent relationship and turned relative to each other through 90°, in such a way that the central axis 20' of the crossbar 16' of the optical system 6' at the left in FIG. 8 is aligned with the central axis 8" of the horizontal crossbar 14" of the right-hand optical system 6", while the central axis 18 18' of the crossbar 14' of the left-hand optical system 6' extends in parallel relationship with the central axis 20" of the crossbar 16" of the right-hand optical system 6".

Otherwise, the two optical systems 6' and 6" are of an identical configuration, as was described with reference to FIGS. 3 through 7.

Figure 9:
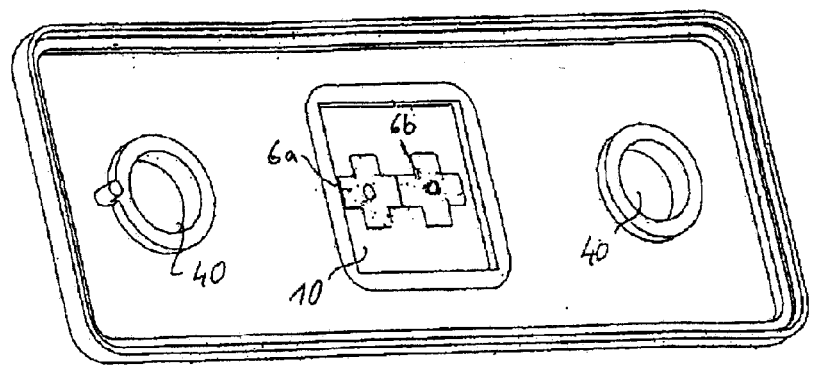
FIG. 9 shows a perspective view of a light cover of a vehicle lamp with an integrated optical system as shown in FIG. 8.

The bodies 8', 8" which comprise a transparent material and into the rear side of which is incorporated the respective optical system 6' and 6" respectively are preferably integrally connected to each other and form for example a part of the light transmission cover 10 of the vehicle lamp shown in FIG. 9.

The arrangement of the two optical systems 6' and 6" in a common plane and the above-described configuration of the optically active elements thereof can provide that the light passing through them, after passing through a near range which is only a few centimeters, is combined to form a single overall light beam which, at medium and greater distances, is of a cruciform cross-section, the two crossbars involving identical light distribution effects. The use of two optical systems which are arranged in mutually juxtaposed relationship in that way, each with a respective associated light emitting diode, has the advantage, over a completely symmetrical configuration of a single optical system with only one light emitting diode, that the two light emitting diodes have to be of a substantially lower level of brightness and are thereby less expensive than a single light emitting diode which would have a level of brightness sufficient for lighting up a cruciform optical system of a completely symmetrical configuration.

FIG. 9 is another perspective view of a vehicle lamp according to the invention, wherein two fixing openings 40 are illustrated in addition to the above-described elements.

The invention claimed is:

1. A vehicle lamp comprising at least one light source (7', 7") and at least one optical system (6', 6") which is formed as a plate-shaped body (8', 8") of transparent material and is arranged in a substantially conical light beam (13) from said light source (7', 7"), which light beam (13) has a central axis of symmetry (HV) and impinges directly on a rear side (10) of said plate-shaped body (8', 8b") and shines therethrough,
   wherein the optical system (6', 6") has two elongate crossbars (14', 16'; 14", 16") each of which has a central longitudinal axis (18', 20'; 18", 20"), said axes (18', 20'; 18", 20") intersecting each other in a point of intersection (15'; 15"),
   wherein said light source (7', 7") is so arranged that said central axis of symmetry (HV) is in substantially perpendicular relationship with a plane defined by said central longitudinal axes (18', 20'; 18", 20") of said two crossbars (14', 16'; 14", 16") and passes there through at said point of intersection (15'; 15"), and
   wherein each crossbar (14', 16'; 14", 16") includes a plurality of optically differently active individual structures (26, 27, 28, 29, 30, 31, 32),
   whereby said optical system (6', 6") produces a cruciform light distribution (3) from said light beam (13) impinging thereon.

2. A vehicle lamp as set forth in claim 1 characterized in that said at least one light source (7', 7") is a light emitting diode.

3. A vehicle lamp as set forth in claim 1 characterized in that at least some of said optically differently active individual structures (26, 27, 28, 29, 30, 31, 32) are arranged one behind the other in the direction of said central longitudinal axis (18', 20'; 18", 20") of said crossbar (14', 16'; 14", 16").

4. A vehicle lamp as set forth in claim 1 characterized in that at least some of the optically differently active individual structures (26, 27, 28, 29, 30, 31, 32) are arranged one beside the other transverse to said central longitudinal axis of said crossbar (14', 16'; 14", 16").

5. A vehicle lamp as set forth in claim 1 characterized in that each of said crossbars (14', 16'; 14", 16") has two arms (14*a*, 14*b*, 16*a*, 16*b*) whose optically active individual structures (26, 27, 28, 29, 30, 31, 32) are of a symmetrical configuration and arrangement with respect to said point of intersection (15'; 15") of said longitudinal axes (18', 20'; 18", 20") of said crossbars (14', 16'; 14", 16").

6. A vehicle lamp as set forth in claim 1 characterized in that said two crossbars (14', 16'; 14", 16") are of differing widths.

7. A vehicle lamp as set forth in claim 1 characterized in that said optically active individual structures (26, 27, 28, 29, 30, 31, 32) of one of said crossbars (14', 16'; 14", 16") are at least partially different from those of the other one of said crossbars (14', 16'; 14", 16").

8. A vehicle lamp as set forth in claim 1 characterized in that at least one of said crossbars (14', 16'; 14", 16") includes transparent but optically inactive regions (12) in addition to said optically active individual structures (26, 27, 28, 29, 30, 31, 32).

9. A vehicle lamp as set forth in claim 1 characterized in that said two crossbars (14', 16'; 14", 16") are at least partially surrounded by transparent, optically inactive regions (12).

10. A vehicle lamp as set forth in claim 1 characterized in that said two crossbars (14', 16'; 14", 16") are in mutually perpendicular relationship.

11. A vehicle lamp as set forth in claim 1 characterized in that there is provided a converging lens (22'; 22") which is concentric with said point of intersection (15'; 15") of said two longitudinal axes (18', 20'; 18", 20") of said crossbars (14', 16'; 14", 16").

12. A vehicle lamp as set forth in claim 11 characterized in that said converging lens (22'; 22") differs from a circular shape insofar as said converging lens (22'; 22") is cut off on two sides by secants (23, 24) in parallel relationship with said longitudinal axis (20'; 20") of one of said crossbars (16'; 16").

13. A vehicle lamp as set forth in claim 1 characterized in that said vehicle lamp includes two optical systems (6', 6") which are arranged in a common plane in mutually juxtaposed relationship in such a way that the longitudinal axes (20'; 18") of two crossbars (16'; 14") one of which belongs to one of said two optical systems (6', 6") whereas the other one belongs to the other one of said two optical systems (6', 6") are aligned with each other and the longitudinal axes (18'; 20") of the other two crossbars (14'; 16") of said two optical systems (6', 6") extend in mutually parallel relationship.

14. A vehicle lamp as set forth in claim 13 characterized in that the optically active individual structures (26, 27, 28, 29, 30, 31, 32) in at least one crossbar (14', 16') of the one optical system (6') are different from the optically active individual structures (26, 27, 28, 29, 30, 31, 32) in the respective identically extending crossbar (14", 16") of the other optical system (6").

15. A vehicle lamp as set forth in claim 14 characterized in that the two crossbars (14', 16'; 14", 16") of each of the two optical systems (6', 6") have different optically active individual structures (26, 27, 28, 29, 30, 31, 32) and that the two optical systems (6', 6") although of an identical configuration are however arranged turned through 90° relative to each other.

* * * * *